US012601163B2

(12) United States Patent
Wang et al.

(10) Patent No.: US 12,601,163 B2
(45) Date of Patent: Apr. 14, 2026

(54) EASILY ASSEMBLED BATHROOM FIXTURE

(71) Applicant: Hsiang-Hung Wang, Changhua County (TW)

(72) Inventors: Hsiang-Hung Wang, Changhua County (TW); Yu-Chang Lin, Changhua County (TW)

(73) Assignee: Wang Hsiang-Hung, Changhua County (TW)

( * ) Notice: Subject to any disclaimer, the term of this patent is extended or adjusted under 35 U.S.C. 154(b) by 89 days.

(21) Appl. No.: 18/673,274

(22) Filed: May 23, 2024

(65) Prior Publication Data

US 2025/0361703 A1 Nov. 27, 2025

(51) Int. Cl.
| | |
|---|---|
| *E03C 1/04* | (2006.01) |
| *E03C 1/046* | (2006.01) |
| *F16K 11/00* | (2006.01) |

(52) U.S. Cl.
CPC .......... *E03C 1/0404* (2013.01); *E03C 1/0465* (2013.01); *F16K 19/006* (2013.01)

(58) Field of Classification Search
CPC ..... E03C 1/0404; E03C 1/0465; F16K 19/006
USPC ... 4/675, 567, 584, 596, 615, 624, 653, 668, 4/671; 137/615, 800, 801, 861; 251/153, 251/155, 340, 349
See application file for complete search history.

(56) References Cited

U.S. PATENT DOCUMENTS

| | | | | |
|---|---|---|---|---|
| 4,650,470 A * | 3/1987 | Epstein | ............... | A61M 3/0208 |
| | | | | 137/625.48 |
| 9,924,701 B1 * | 3/2018 | Chalmers | ................. | A01K 7/06 |
| 12,325,987 B2 * | 6/2025 | Kim | ..................... | E03C 1/0405 |

| | | | | |
|---|---|---|---|---|
| 2012/0151672 A1 * | 6/2012 | Bucher | .................... | A47K 1/04 |
| | | | | 4/650 |
| 2017/0335985 A1 * | 11/2017 | Guo | ......................... | F16K 23/00 |
| 2023/0250618 A1 * | 8/2023 | Downey | .............. | E03C 1/0412 |
| | | | | 137/315.12 |
| 2024/0159027 A1 * | 5/2024 | Tracy | ................... | E03C 1/0404 |

FOREIGN PATENT DOCUMENTS

| | | | | | | |
|---|---|---|---|---|---|---|
| BR | 102013023565 A2 | * | 6/2015 | ............... | E03C 1/04 |
| CN | 105840896 A | * | 8/2016 | ............... | E03C 1/08 |
| CN | 211039851 U | * | 7/2020 | ............... | E03C 1/04 |
| CN | 220770212 U | * | 4/2024 | ............... | E03C 1/04 |
| EP | 3745005 A1 | * | 12/2020 | .......... | E03C 1/0405 |
| EP | 2229487 B2 | * | 7/2023 | .......... | E03C 1/0404 |
| JP | 7161759 B2 | * | 10/2022 | .......... | E03C 1/0404 |
| KR | 102167271 B1 | * | 10/2020 | ............. | B29C 45/14 |
| KR | 102341283 B1 | * | 12/2021 | ............... | E03C 1/04 |
| KR | 20230158691 A | * | 11/2023 | ............... | E03C 1/04 |
| TW | 202208726 A | * | 3/2022 | .......... | E03C 1/0405 |
| TW | M667461 U | * | 3/2025 | ............... | E03C 1/04 |
| WO | WO-2021231458 A1 | * | 11/2021 | .......... | E03C 1/0405 |

* cited by examiner

*Primary Examiner* — Lori L Baker

(74) *Attorney, Agent, or Firm* — Leong C. Lei

(57) ABSTRACT

The easily assembled bathroom fixture includes a faucet body and a pipe fixing assembly, wherein an inlet valve of the pipe fixing assembly is equipped with a flexible hose. This flexible hose extends along the interior of the faucet body to an outlet portion, where the bottom surface features a water outlet. At the upper end of the water outlet, there is a narrow groove. Inserting a bent pipe fitting into the water outlet and passing through the narrow groove allows it to seamlessly integrate with the flexible hose, achieving convenient assembly.

7 Claims, 7 Drawing Sheets

EASILY ASSEMBLED BATHROOM FIXTURE

BACKGROUND OF THE INVENTION

(a) Technical Field of the Invention

The present invention is generally related to bathroom fixtures such as faucets and soap dispensers, and more particularly to an easily assembled bathroom fixture.

(b) Description of the Prior Art

In most bathroom fixtures such as the faucets, the main structure is made of lead-free copper or stainless steel. Such bathroom fixtures allow tap water to be delivered to users after passing through metal pipes. However, water, after passing through metal pipes, may release metal ions, which could pose health risks after prolonged use.

To address this issue, some manufacturers have developed bathroom fixtures with built-in hoses to mitigate the problem. However, these prior arts may encounter the following problems.

1. FIG. 1 is a sectional diagram of a traditional sensor faucet 50. As illustrated, a water aerator (not shown) needs to be additionally installed at the water outlet 51 of the faucet 50. To connect the hose 52 inside the faucet 50 with the water aerator, usually, a 90-degree bent pipe fitting 53 is installed at the front end of hose 52. However, the size of water outlet 51 is fixed. When the bent pipe fitting 53 is inserted into water outlet 51, it may collide with an upper side of the pipe wall, making it difficult to assemble the bent pipe fitting 53.

2. As shown in FIG. 1, since the hose 52 is only connected to the water aerator by insertion, there is a possibility of the hose 52 becoming detached, which would be inconvenient as it would require reinstallation of the bent pipe fitting 53.

3. The hose 52 is also connected to a water inlet valve (not shown) by insertion, which may also lead to detachment of the hose 52. Moreover, during assembly, pulling on the hose 52 may cause the end of the hose 52 connected to the water inlet valve to detach.

SUMMARY OF THE INVENTION

The main objective of the present invention is to provide an easily assembled bathroom fixture. This fixture involves installing a flexible hose within the faucet body to prevent tap water or hand soap from coming into contact with the faucet body, thereby enhancing safety during use. Additionally, the invention allows the faucet body to be made of materials other than just lead-free copper or stainless steel, significantly reducing manufacturing costs.

The secondary objective of the present invention is to provide a narrow groove at one end of the water outlet of the faucet body. When installing the bent pipe fitting onto the flexible hose, it will not come into contact with the upper wall surface of the faucet body, thereby achieving the benefit of easy installation.

Another objective of the present invention is to provide an easily assembled bathroom fixture. The flexible hose is securely fixed to the bent pipe fitting and the inlet valve through plastic welding to prevent detachment. Additionally, within the compression block used for securing the sensor electronic control assembly, there is a mechanism for fastening the flexible hose. This ensures convenience during installation.

The present invention includes a faucet body, and a pipe fixing assembly.

The faucet body has an integral hollow structure comprising an arc-shaped outlet portion.

The pipe fixing assembly comprises an inlet pipe, an inlet valve configured to a predetermined location of the inlet pipe to guide a fluid through the outlet portion, and a circular compression block.

The bathroom fixture is characterized in that a flexible hose extends inside the faucet body from the inlet valve to the outlet portion; a bottom surface of the outlet portion features a circular outlet; a narrow groove is configured at an upper end of the outlet that communicates with an inner surface of the outlet portion; a 90-degree bent pipe fitting is inserted into the water outlet and, through the narrow groove, an end of the bent pipe fitting seamlessly integrate with a top end of the flexible hose, achieving convenient assembly;

In an embodiment, the flexible hose with the bent pipe fitting are integrally combined through plastic welding.

In an embodiment, the flexible hose with the inlet valve are integrally combined through plastic welding.

In an embodiment, another end of the bent pipe fitting is configured with a water aerator; a thickened layer is provided at a junction of the bent pipe fitting with the narrow groove.

In an embodiment, a groove is provided on an inner side of the compression block; and a fastener is installed in the groove to secure the flexible hose and the inlet valve, preventing detachment.

In an embodiment, the fluid is tap water.

In an embodiment, the fluid is hand soap.

Through the above described structure, the present invention may achieve the following advantages.

1. The present invention features a narrow groove at the top of the water outlet of the outlet portion, providing the advantage of easy assembly for the bent pipe fitting.

2. The present invention uses a flexible hose to guide tap water or hand soap. During use, tap water or hand soap does not come into contact with the faucet body, preventing metal contamination.

3. The present invention combines flexible hoses using plastic welding, preventing detachment.

4. The present invention installs fasteners within the compression block to prevent detachment of the flexible hose from the inlet valve.

5. Since tap water or hand soap is conveyed through the flexible hose, the faucet body can be made of metal as well as plastic or natural materials.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
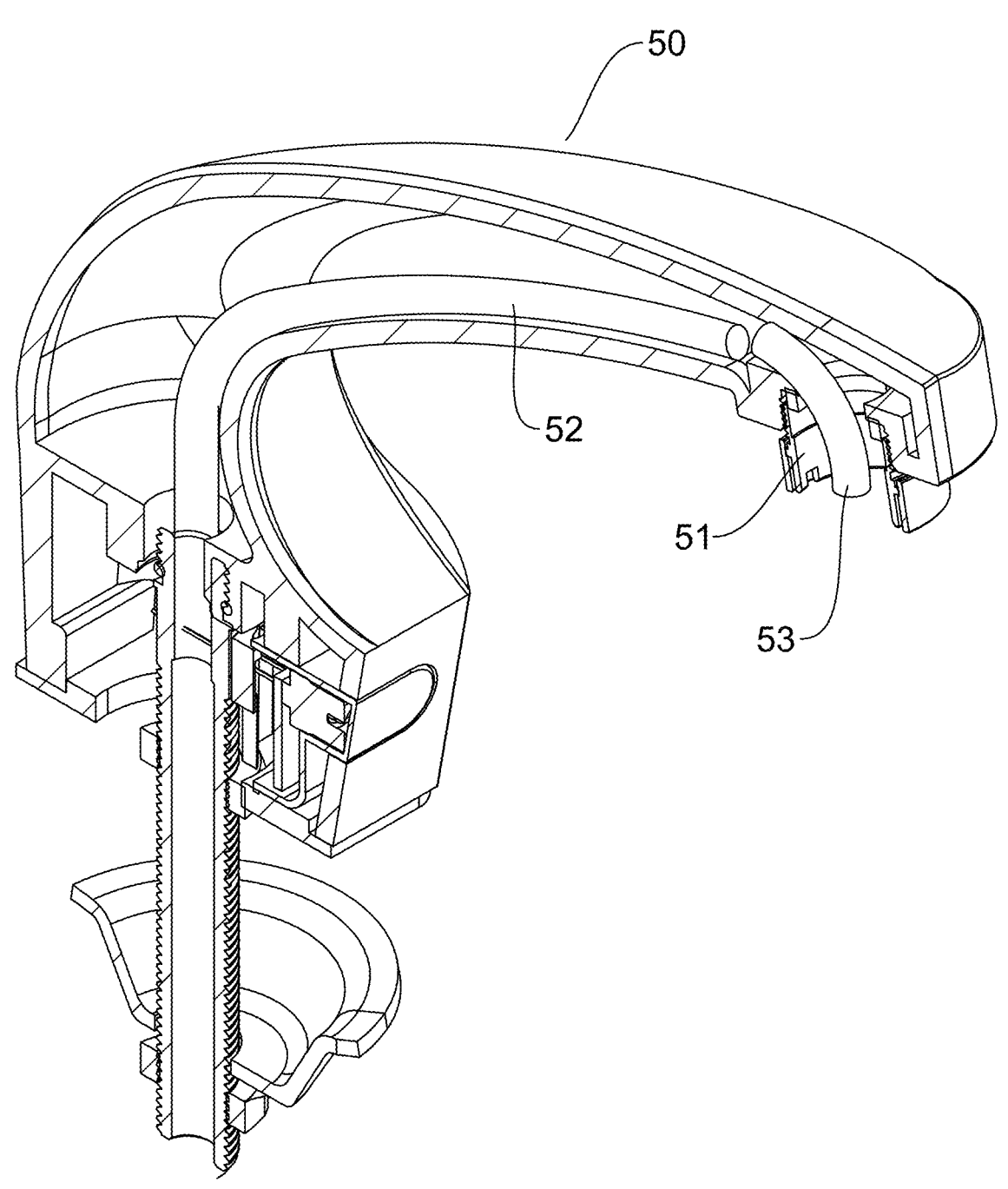
FIG. 1 is a section diagram showing a conventional faucet.
Figure 2:
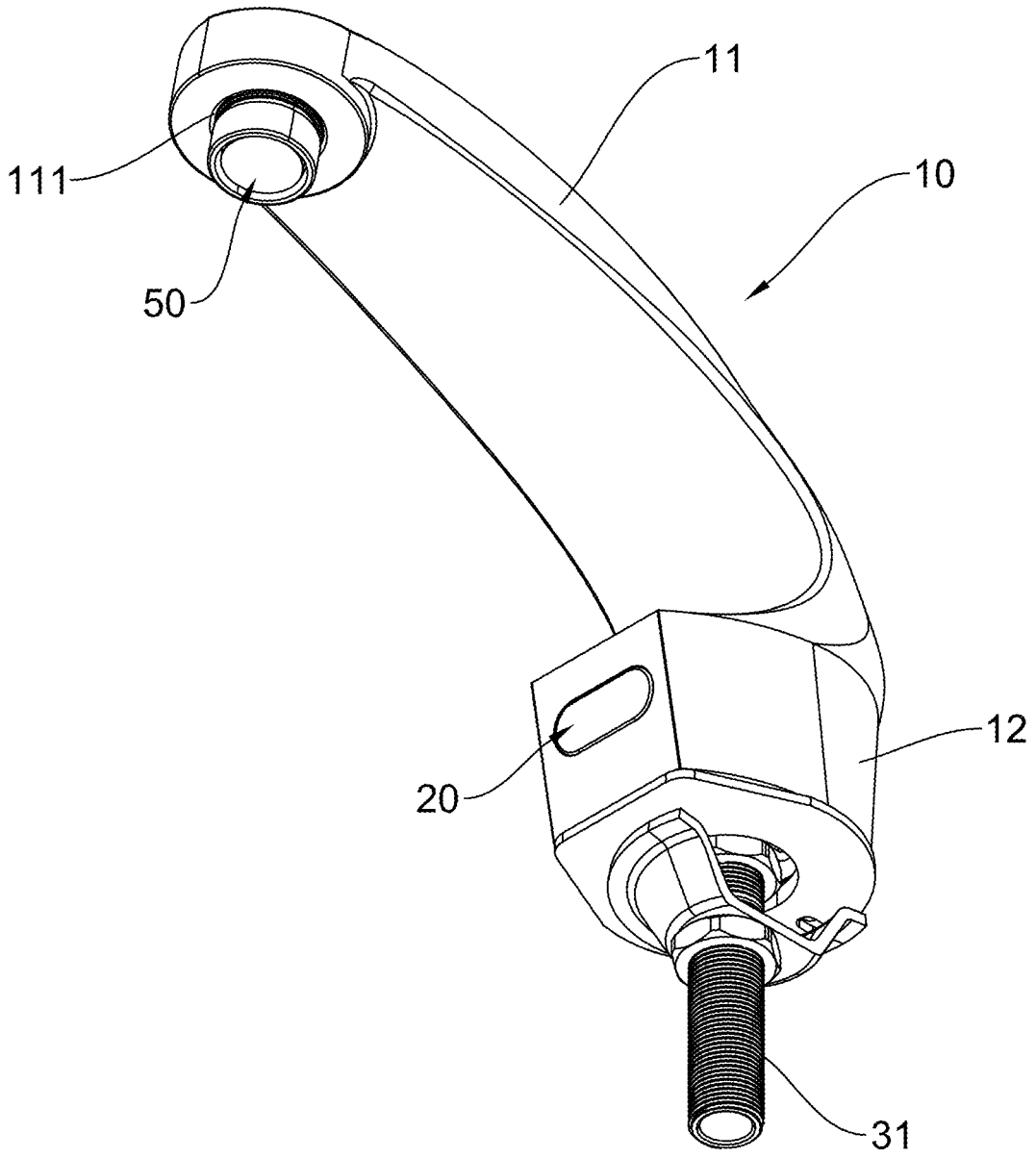
FIG. 2 is a perspective diagram showing an embodiment of the present invention.
Figure 3:
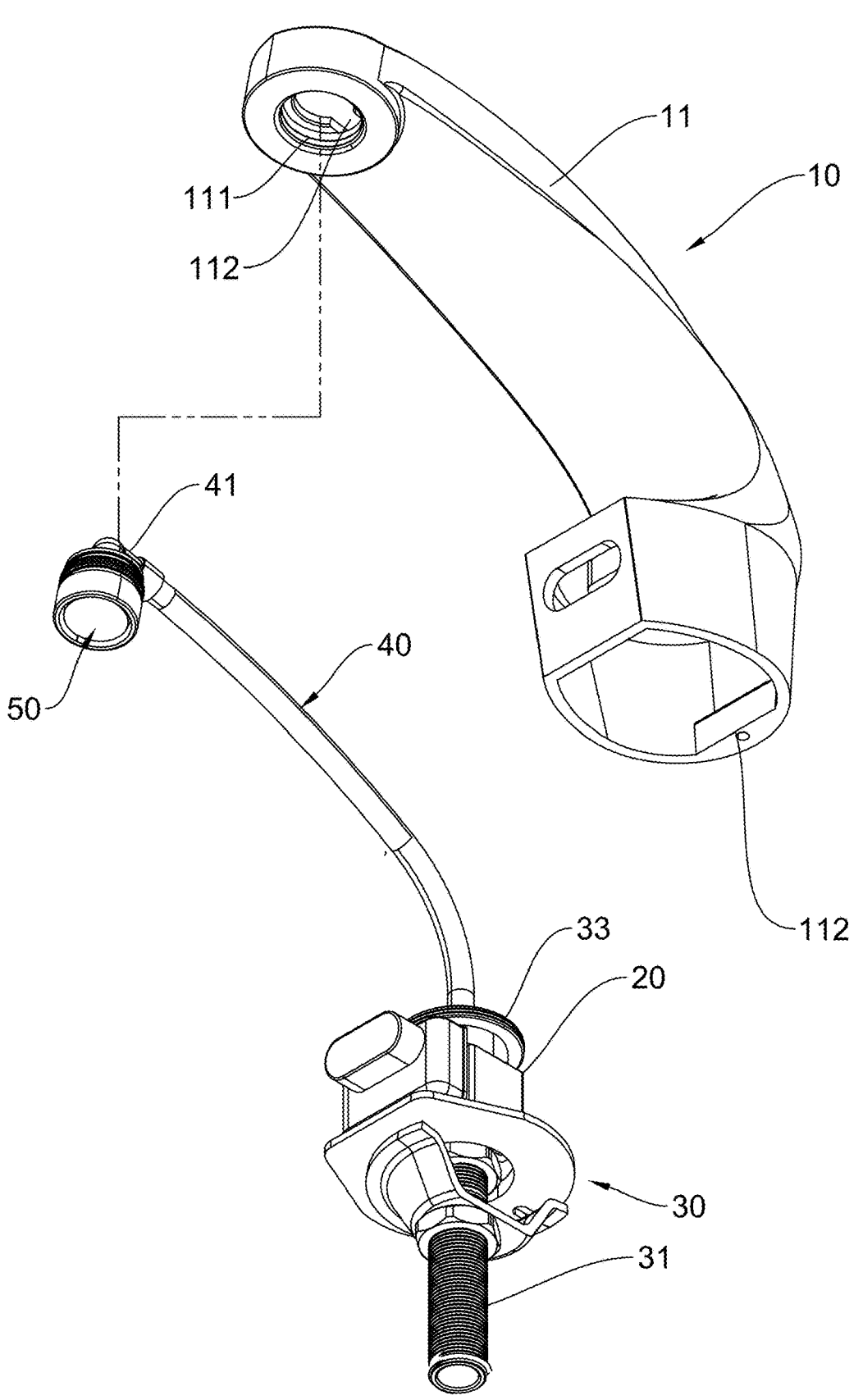
FIG. 3 is a perspective break-down diagram showing the embodiment of FIG. 2.

The following embodiment of an easily assembled bathroom fixture of the present invention is illustrated using an electronic faucet as an example, but the present invention can actually be applied to conventional faucets or sensor-operated soap dispensers, etc. As shown in FIGS. 2 to 3, the bathroom fixture includes a faucet body 10, a sensor electronic control assembly 20, and a pipe fixing assembly 30.

Figure 4:
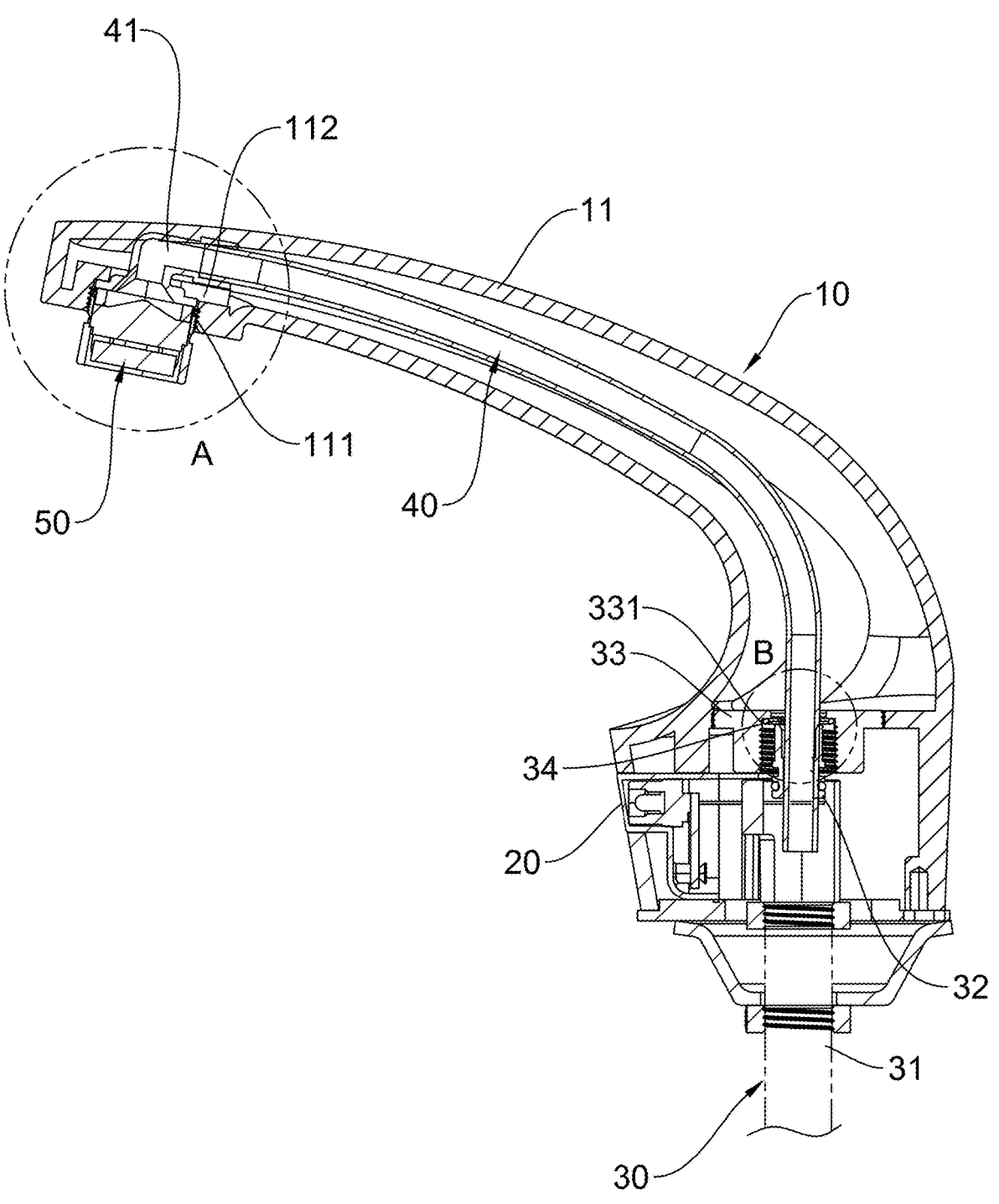
FIG. 4 is a sectional diagram showing the embodiment of FIG. 2.

As shown in FIGS. 2 to 4, the faucet body 10 has an integral hollow structure which includes an arc-shaped outlet portion 11 and a bottom portion 12 configured to a bottom end of the outlet portion 11.

As shown in FIGS. 2 to 4, the sensor electronic control assembly 20 is configured on the bottom portion 12. The sensor electronic control assembly 20 is basically identical to a conventional electronic faucet and its details is omitted here.

As shown in FIGS. 2 to 4, the pipe fixing assembly 30 is housed inside the bottom portion 12, and includes an inlet pipe 31, allowing the pipe fixing assembly 30 to be secured to a platform (not depicted in the figures) via a nut. As shown in FIGS. 3 and 4, An inlet valve 32 is configured to a predetermined location, such as the upper end, of the inlet pipe 31 to guide fluid through the outlet portion 11. Additionally, a circular compression block 33 is installed at the upper end of the sensor electronic control assembly 20. This compression block 33 secures the sensor electronic control assembly 20 in place.

Figure 5:
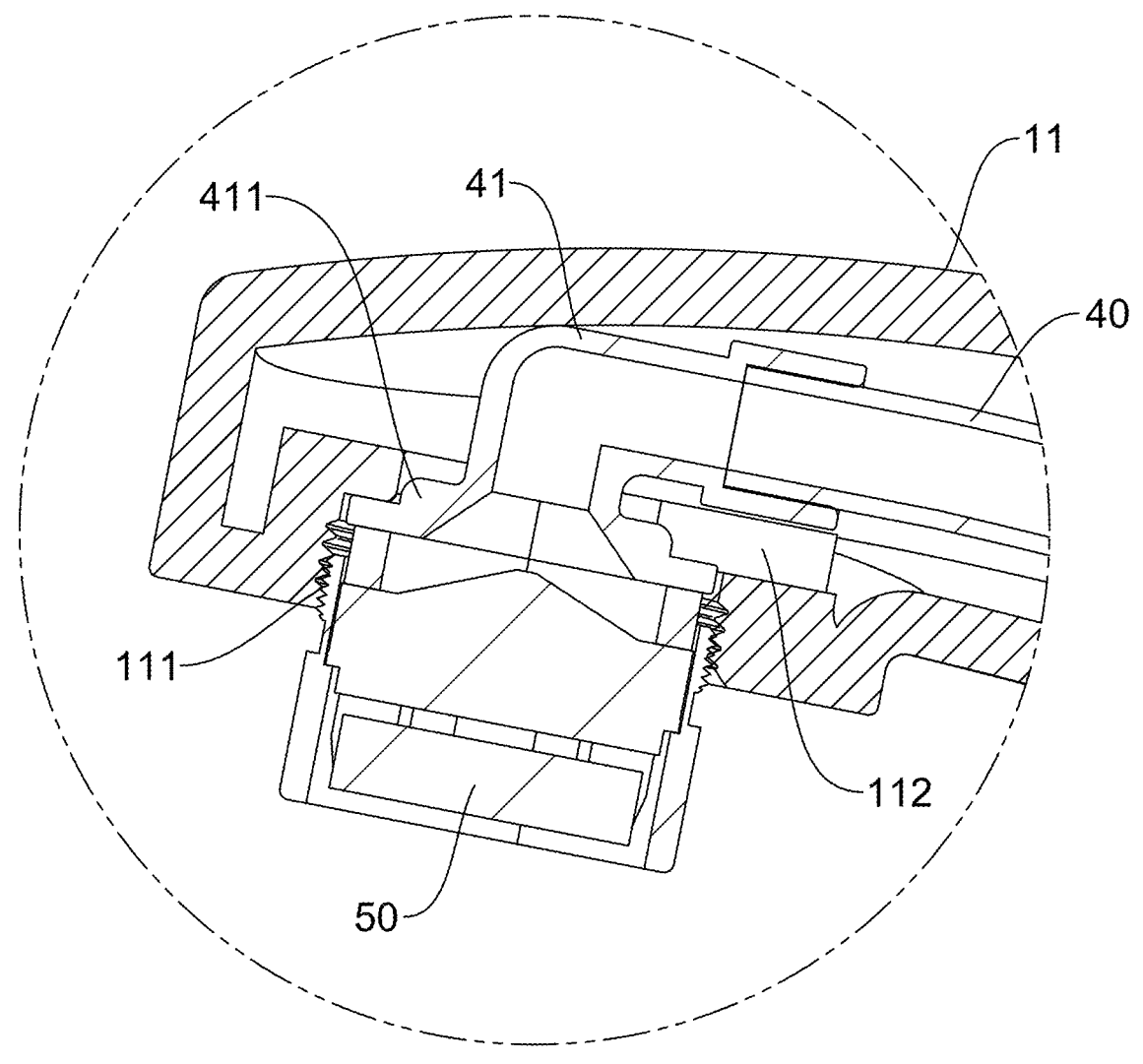
FIG. 5 is a sectional diagram showing a part of FIG. 4 within the circle A.
Figure 6:
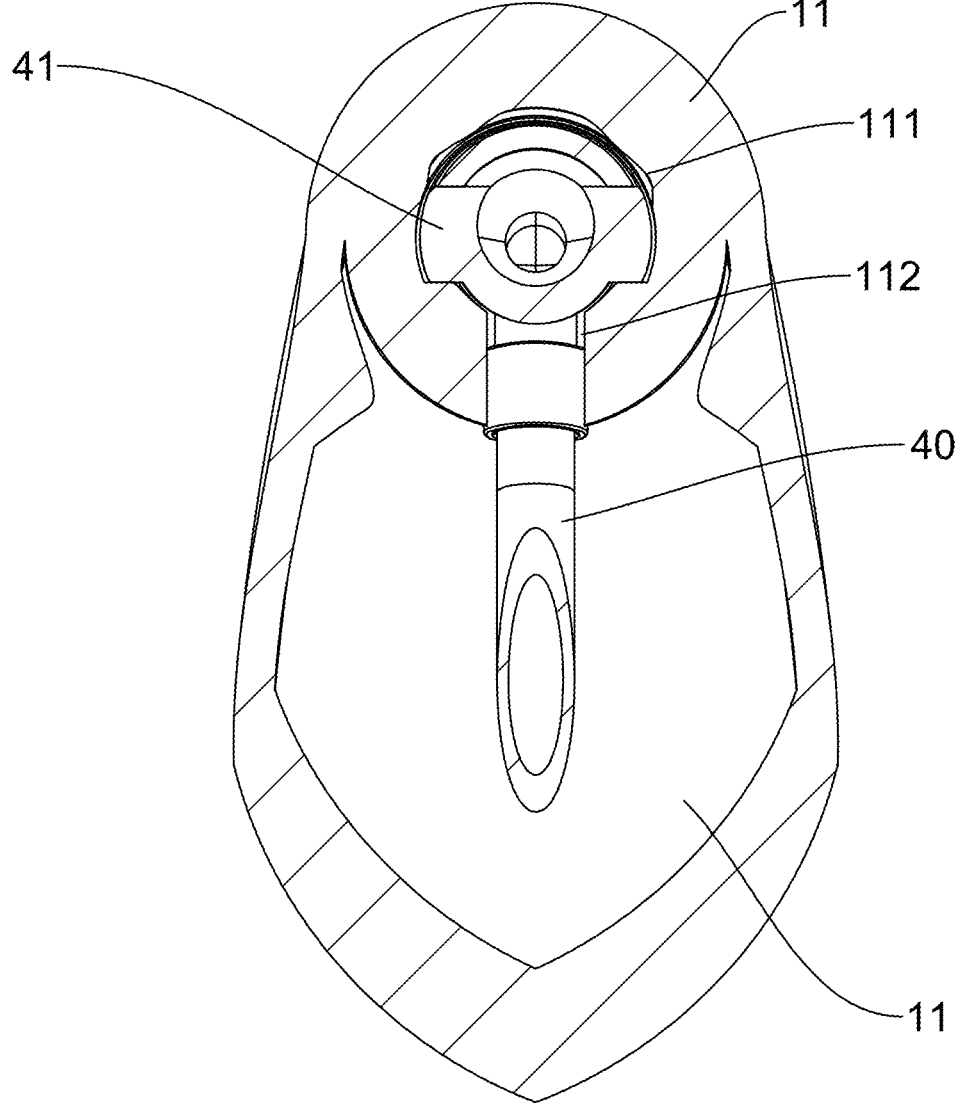
FIG. 6 is a bottom-view diagram showing a part of FIG. 4 within the circle A.

As shown in FIGS. 4 to 6, a flexible hose 40 extends along the interior of the faucet body 10 from the inlet valve 32 of the pipe fixing assembly 30 to the outlet portion 11. A bottom surface of the outlet portion 11 features a circular outlet 111. At the upper end of the outlet 111, there is a narrow groove 112 that communicates with the inner surface of the outlet portion 11. A 90-degree bent pipe fitting 41 is inserted into the water outlet 111 and, through the narrow groove 112, the bent pipe fitting 41 seamlessly integrate with a top end of the flexible hose 40, achieving convenient assembly.

Figure 7:
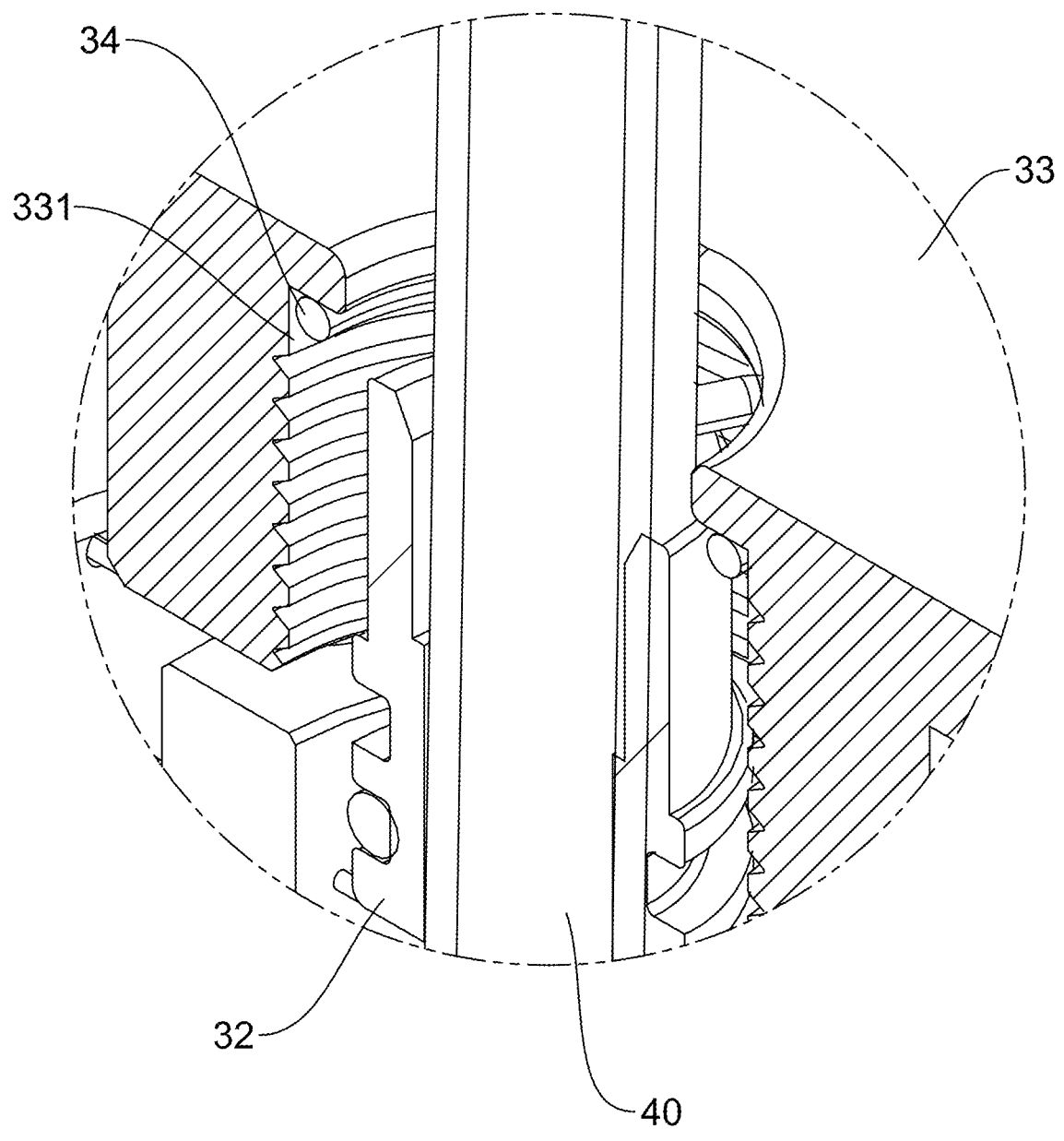
FIG. 7 is a sectional diagram showing a part of FIG. 4 within the circle B.

As shown in FIGS. 5 and 7, in the present invention, to prevent the flexible hose 40 from detaching, both the flexible hose 40 with the bent pipe fitting 41 and the flexible hose 40 with the inlet valve 32 are integrally combined through plastic welding. In the present embodiment as a sensor faucet, to prevent splashing of tap water, a water aerator 50 is installed to the bent pipe fitting 41. Additionally, a thickened layer 411 is provided at the junction of the bent pipe fitting 41 with the narrow groove 112. This thickened layer 411 prevents deformation caused by installing the water aerator 50. The structure of the present invention can also be applied to sensor soap dispensers without the need for installing a water aerator 50, allowing the hand soap to be dispensed directly from the bent pipe fitting 41.

As shown in FIG. 7, because the inlet valve 32 is installed within the bottom portion 12, to prevent the flexible hose 40 from detaching due to assembly pulling, a groove 331 is provided on the inner side of the compression block 33. A fastener 34 is installed in this groove 331 to secure the position of the flexible hose 40 and the inlet valve 32. Besides using the aforementioned fastener 34, alternative methods can also be chosen. Radial holes can be drilled in the compression block 33, followed by screwing in a screw to secure the position of the flexible hose 40 and the inlet valve 32, preventing detachment. Furthermore, a radial slot can be cut into the compression block 33, and a C-shaped clip can be inserted from the outside to secure the position of the flexible hose 40 and the inlet valve 32, preventing detachment.

Through the above described structure, the present invention may achieve the following advantages.

1. The present invention features a narrow groove 112 at the top of the water outlet 111 of the outlet portion 11, providing the advantage of easy assembly for the bent pipe fitting 41.

2. The present invention uses a flexible hose 40 to guide tap water or hand soap. During use, tap water or hand soap does not come into contact with the faucet body 10, preventing metal contamination.

3. The present invention combines flexible hoses 40 using plastic welding, preventing detachment.

4. The present invention installs fasteners 34 within the compression block 33 to prevent detachment of the flexible hose 40 from the inlet valve 32.

5. Since tap water or hand soap is conveyed through the flexible hose 40, the faucet body 10 can be made of metal as well as plastic or natural materials.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A bathroom fixture comprising a faucet body and a pipe fixing assembly, where the faucet body has an integral hollow structure comprising an arc-shaped outlet portion, the pipe fixing assembly comprises an inlet pipe, an inlet valve configured to a predetermined location of the inlet pipe to guide a fluid through the outlet portion, and a circular compression block, the bathroom fixture characterized in that a flexible hose extends inside the faucet body from the inlet valve to the outlet portion; a bottom surface of the outlet portion features a circular outlet; a narrow groove is configured at an upper end of the outlet that communicates with an inner surface of the outlet portion; a 90-degree bent pipe fitting is inserted into the water outlet and, through the narrow groove, an end of the bent pipe fitting seamlessly integrate with a top end of the flexible hose, achieving convenient assembly; and another end of the bent pipe fitting is configured with a water aerator; a thickened layer is provided at a junction of the bent pipe fitting with the narrow groove.

2. The bathroom fixture according to claim 1, wherein the flexible hose with the bent pipe fitting are integrally combined through plastic welding.

3. The bathroom fixture according to claim 1, wherein the flexible hose with the inlet valve are integrally combined through plastic welding.

4. The bathroom fixture according to claim 1, wherein a groove is provided on an inner side of the compression block; and a fastener is installed in the groove to secure the flexible hose and the inlet valve, preventing detachment.

5. The bathroom fixture according to claim 1, wherein a radial hole is drilled in the compression block; and a screw is screwed in to secure the flexible hose and the inlet valve, preventing detachment.

6. The bathroom fixture according to claim 1, wherein the fluid is tap water.

7. The bathroom fixture according to claim 1, wherein the fluid is hand soap.

* * * * *